June 8, 1965  E. B. HENRY, JR., ETAL  3,188,451
MECHANISM FOR COUNTING THE OPERATIONS OF A MACHINE
Filed March 21, 1962  3 Sheets-Sheet 1

INVENTORS.
EDWIN B. HENRY JR. and
WILLIAM L. ZEMBERRY
By Donald G. Dalton
Attorney INVENTORS.
EDWIN B. HENRY JR. and
WILLIAM L. ZEMBERRY
By Donald G. Dalton
Attorney

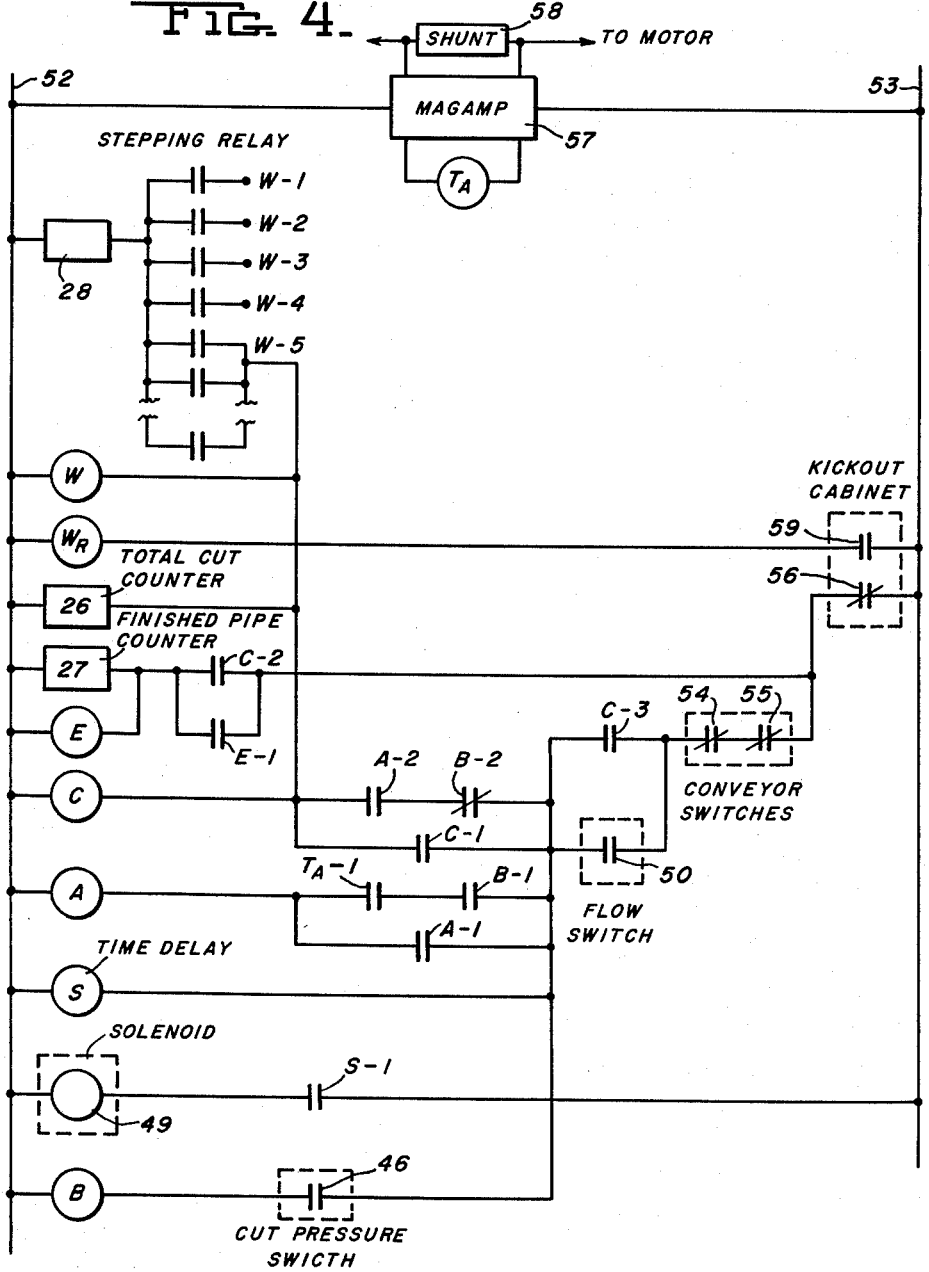

United States Patent Office 3,188,451
Patented June 8, 1965

3,188,451
MECHANISM FOR COUNTING THE OPERATIONS OF A MACHINE
Edwin B. Henry, Jr., Mount Lebanon Township, Allegheny County, and William L. Zemberry, Swissvale, Pa., assignors to United States Steel Corporation, a corporation of New Jersey
Filed Mar. 21, 1962, Ser. No. 181,345
9 Claims. (Cl. 235—92)

This invention relates to an improved mechanism for counting the number of operations which a machine performs.

Although the invention is not thus limited, our counting mechanism is particularly useful when applied to a cutoff machine which crops defective end portions of pipes during their manufacture and thereafter bevels the ends. Often it is necessary to crop several segments from the end of a pipe before finding a place where the wall thickness meets specifications throughout the circumference. The usual practice is for an inspector to mark each pipe at the place he believes it should be cropped to find acceptable walls. The cutoff machine operator cuts the pipe first at the inspector's mark and checks the wall thickness. If the thickness does not meet specifications, the operator cuts the pipe again four inches from the first cut. If the thickness still fails to meet specifications, he must cut one or two more four-inch segments from the pipe. After cutting four such segments, he may cut a three-foot segment. After finding acceptable walls, the operator may use the same machine to bevel the end of the pipe. Our counting mechanism furnishes a record of (a) the total number of cuts the machine makes, (b) the number of pipes the machine handles, and (c) the number of cuts in excess of four made on any one pipe, but it excludes counts of beveling operations. Nevertheless it is apparent our counting mechanism may be used with other types of machines where the number of machine operations may exceed the number of articles handled.

Our counting mechanism is an improvement over that shown in Henrici and Zemberry Patent No. 2,797,049, of common ownership. The Henrici et al. patent shows a counting mechanism applied to a pipe cutoff machine for counting the total number of cuts and the number of pipes handled, but excluding beveling operations from the count. The mechanism includes a circuit intended to make it tamper-proof, that is, to prevent it from counting either simulated operations of the machine or beveling operations as cuts. Nevertheless we have observed there is still a way in which an operator can induce this mechanism to count simulated operations. After completing a cut, retracting the cutting tool, and obtaining a count, the operator may again advance the cutting tool. Thereafter the mechanism counts beveling operations as cuts.

An object of our invention is to provide an improved counting mechanism which is fully tamper-proof, that is, which eliminates the possibility of counting simulated operations as in the aforementioned patent.

A further object is to provide an improved counting mechanism which employs simpler circuits than those shown in the aforementioned patent and in which all relays are deenergized when the mechanism is idle.

A further object is to provide a counting mechanism which, as applied to a pipe cutoff machine, obtains a count of the number of cuts in excess of four made on any one pipe, as well as the total number of cuts and the number of pipes the machine handles.

A more specific object is to provide a counting mechanism applied to a pipe cutoff machine, which mechanism includes a pressure switch operated by the hydraulic feed for the cutting tool, and means to prevent operations of the machine from registering as counts unless this switch is closed.

A further object is to provide improved means for operating an electric switch in response to pressure differences in a hydraulic circuit.

In accomplishing these and other objects of the invention, we have provided improved details of structure, a preferred form of which is shown in the accompanying drawings, in which:

FIGURE 4 is a schematic wiring diagram of our counting mechanism.

Figure 1:
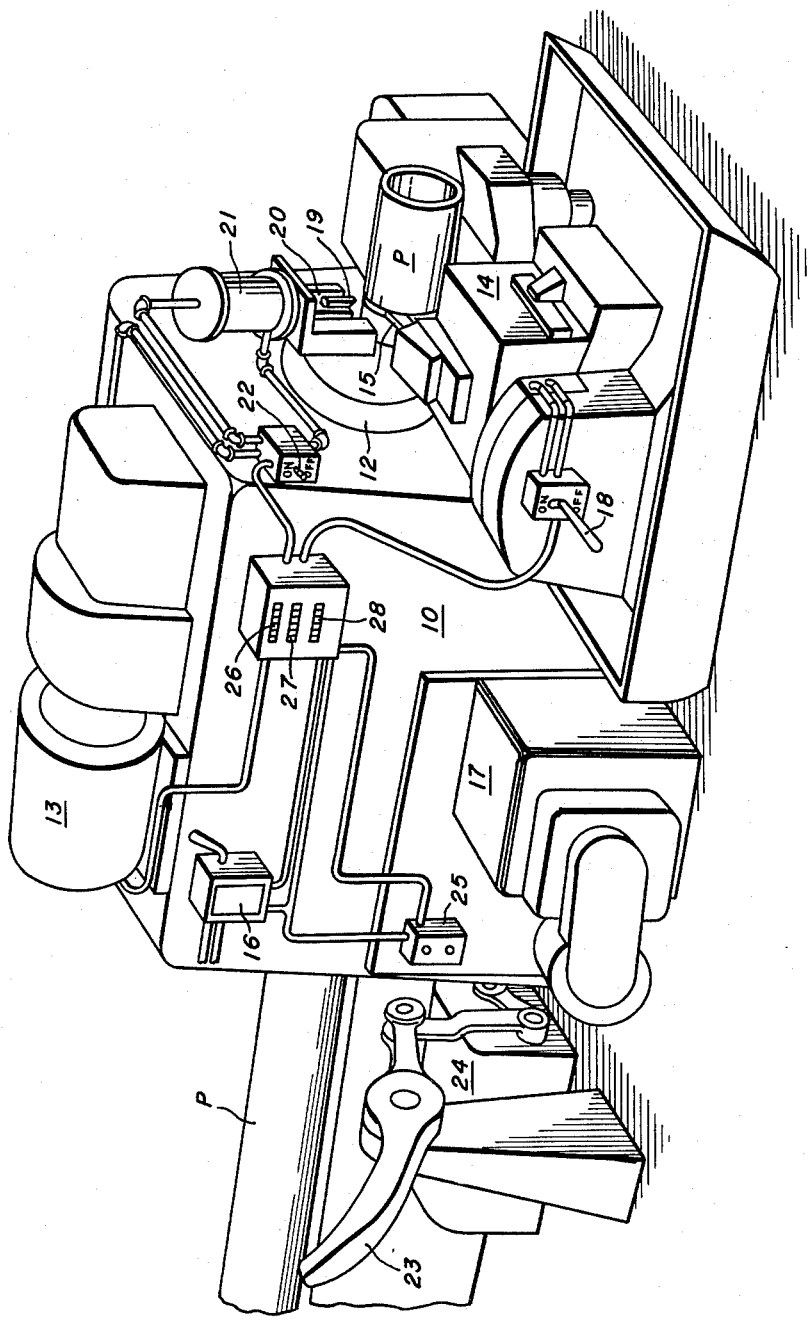
FIGURE 1 is an isometric view of a pipe cutoff machine equipped with our improved counting mechanism.

FIGURE 1 shows a conventional pipe cutoff machine which comprises a housing 10, a pipe-gripping chuck 12 journaled in said housing, a main drive motor 13 for rotating said chuck, a reciprocable tool feed platen 14, a cutting tool 15 mounted on said platen, and an operating switch 16 for controlling motor 13. The operator closes switch 16 to start the motor and thus rotate the chuck. A conveyor (not shown) carries a pipe P into the housing from the left. The rotating chuck grips the pipe just behind the plane at which it is to be cropped. The tool feed platen 14 operates hydraulically through pressure supplied by a motor-driven pump 17. A handle 18 controls the hydraulic circuit and thus controls movement of the platen. After the pipe is gripped and rotating, the operator moves handle 18 from its "off" to its "on" position to advance the platen and thus cut the pipe. On completion of a cut, the operator returns this handle to its "off" position to retract the platen, although some cutoff machines have means for retracting the platen automatically. The operator checks the wall thickness at the end of the pipe; if the thickness does not meet specifications, he advances the pipe four inches and makes another cut. If necessary, he repeats these steps two more times. If he still does not find acceptable wall, he advances the pipe three feet and makes a fifth cut.

The cutoff machine also is equipped with a beveling tool 19 which the operator can use to bevel the cut end of the pipe where a beveled end is desired. The beveling tool is mounted on a reciprocable carriage 20 operated by a pneumatic cylinder 21. A handle 22 controls the pneumatic circuit. Normally the operator bevels the pipe end after he finishes cutting and retracts the platen, but he can vary this sequence (a) by starting to bevel shortly after he starts to cut and finishing beveling before he finishes cutting, (b) by starting to bevel shortly after he starts to cut but finishing cutting before he finishes beveling, or (c) by beveling after he finishes cutting but before he retracts the platen. In each instance, he performs the beveling operation by moving handle 22 from its "off" to its "on" position to advance carriage 20 and tool 19 toward the pipe. When he finishes beveling, he returns handle 22 to its "off" position to retract the carriage and tool.

The machine has a kickout arm 23, a motor 24 for operating the kickout arm, and a switch 25 for controlling motor 24. After the operator has cut the necessary segments from the end of the pipe and found a place where the wall is acceptable and beveled the end if desired, he releases the chuck 12, which is still rotating. Next the conveyor retracts the pipe toward the left. The operator then closes switch 25 to operate the kickout arm 23 and thus remove the pipe from the machine.

Since the parts thus far described are conventional, no more detailed showing is deemed necessary. Reference can be made to Hornberger Patent No. 1,772,148 or Libby Patent No. 1,972,595 for complete showings of machines of this type, although it is apparent our counting mechanism can be used on other machines. In common with the machine shown in the aforementioned Henrici et al. patent, the machine carries a "total cut" counter 26 which registers the total number of cuts the machine makes, and a "finished pipe" counter 27 which registers the number of pipes handled. In accordance with the present invention, we add a third counter 28 which registers the number of cuts in excess of four made on any one pipe. The counters per se are conventional and hence not shown nor described in detail.

Hydraulic circuit

Figure 2:
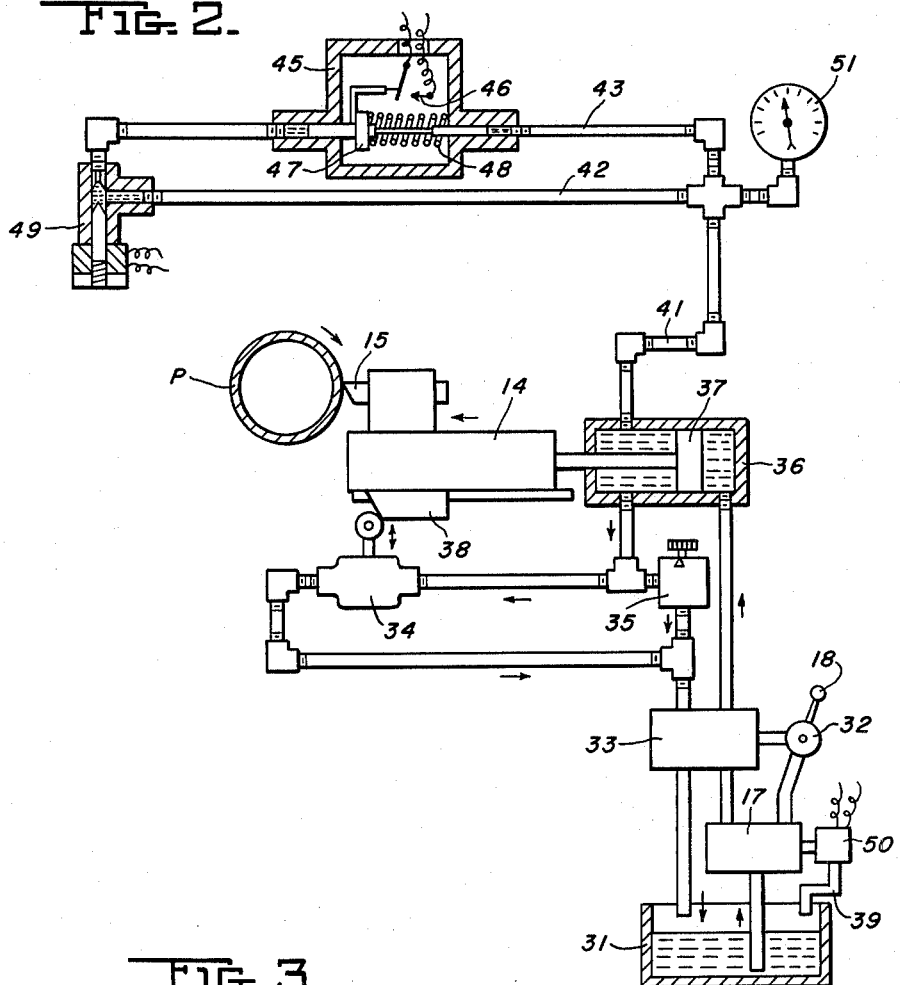
FIGURE 2 is a diagrammatic view of the hydraulic circuit for operating the cutting tool platen of the machine shown in FIGURE 1, and showing the pressure switch which must close before an operation of the machine can register as a count.

FIGURE 2 shows diagrammatically the conventional hydraulic circuit of the cutoff machine. The circuit includes the aforementioned pump 17, a supply tank 31, a tool feed valve 32 operated by handle 18, a pilot-operated valve 33, a deceleration valve 34, a feed control valve 35, a double-acting cylinder 36, and a piston 37 housed in said cylinder and attached to the tool platen 14. Before a cut is made, piston 37, platen 14 and the cutting tool 15 occupy a retracted position toward the right, and pump 17 idly delivers hydraulic fluid from tank 31 through valve 33 and back to the tank. To advance the tool and make a cut, the operator moves handle 18 toward the left, whereupon valves 32 and 33 shift to admit hydraulic fluid from pump 17 to the right end of cylinder 36 and to return fluid from the left end of the cylinder to tank 31. The deceleration valve 34 and feed control valve 35 afford parallel routes for the returning fluid. As the platen commences to advance, the deceleration valve is open and allows returning fluid to pass freely for a fast approach. When the tool is about to engage pipe P, a cam 38 on the platen closes the deceleration valve, whereupon fluid can return to the tank only via the more restricted feed control valve 35. Thus the tool goes into "fine feed" during which it advances slowly into the pipe, makes its cut, and overtravels the pipe wall. Pump 17 continues to deliver the same volume of hydraulic fluid as before, and the excess returns to tank 31 through a bypass 39. Thereafter the operator moves handle 18 to the right to shift valves 32 and 33 back to their original positions and return the platen, or the platen can return automatically. As the platen returns, fluid flows in the other direction between the tank and cylinder, but the feed control valve allows a more rapid flow in this direction.

In accordance with our invention, we connect a conduit 41 to the left end of cylinder 37. This conduit has branches 42 and 43 which lead to the left and right ends of the housing 45 of a conventional pressure-difference switch 46. The housing contains a slidable actuating member 47 and a compression spring 48 which urges the actuating member toward the left. The left end of this member is of greater cross-sectional area than the right end. The compression of spring 48 is adjusted to balance the greater force on the left end of the actuating member as long as the pressures on both ends of the actuating member are equal. Thus the contacts of switch 46 remain open. Branch conduit 42 contains a normally open solenoid-operated valve 49. We mount a normally open flow switch 50 in the bypass 39 of pump 17 to close when the pump delivers fluid through the bypass under "fine feed" conditions. As hereinafter fully described, switch 50 is electrically connected to the solenoid of valve 49 through a time delay relay S (shown in FIGURE 4) to energize the solenoid and close the valve a short time after switch 50 closes. Closing this valve locks the pressure on the left end of the actuating member 47 at its value at the moment of closing. When the pressure on the right end diminishes, switch 46 closes. Preferably we connect a pressure gauge 51 to the branch conduit 43.

Figure 3:
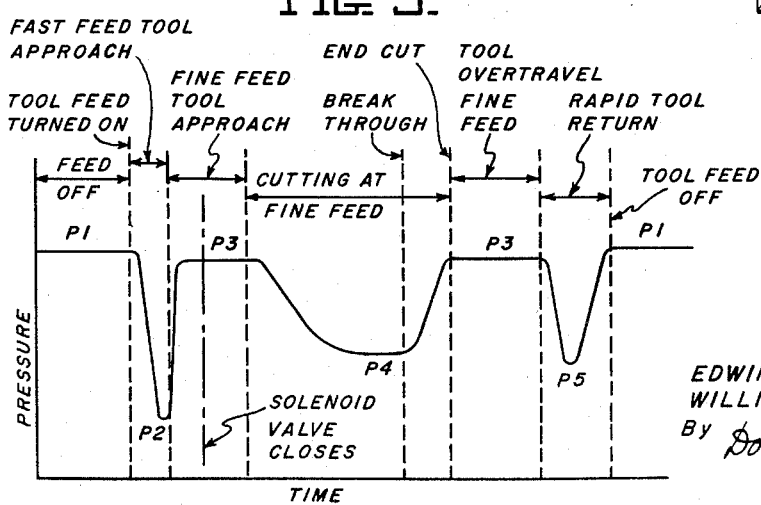
FIGURE 3 is a graph showing how pressure in the hydraulic circuit varies through different phases of cutting machine operation.

FIGURE 3 shows graphically how the pressure in the left end of cylinder 36 varies through different phases of cutting tool operation. Initially the pressure has a relatively high constant value $P_1$. When the operator moves handle 18 to advance the cutting tool 15, the pressure drops to a relatively low value $P_2$ during the rapid approach of the cutting tool. When cam 38 closes the deceleration valve 35, the pressure rises to a higher value $P_3$ during "fine feed" of the cutting tool. After "fine feed" starts, the time delay relay S provides a delay sufficient for the pressure to build up to its value $P_3$ before completing the circuit which energizes the solenoid of valve 49. When the tool 15 actually starts to cut the pipe, the pressure in the left end of the cylinder drops to a lower value $P_4$, which is transmitted to the right end of the actuating member 47. The pressure difference closes switch 46. When the tool breaks through the pipe wall, the pressure commences to rise, and it returns to the value $P_3$ on completion of the cut. The pressures on the ends of the actuating member 47 again are equal, whereupon switch 46 opens. When the operator moves handle 18 back to retract the cutting tool, the pressure drops to a lower value $P_5$, but switch 50 opens to deenergize the solenoid of valve 49 and open this valve. Hence the pressures on both ends of the actuating member 47 are still equal and switch 46 remains open. When the cutting tool is fully retracted, the pressure again rises to the initial value $P_1$.

Electric circuit

FIGURE 4 shows schematically our preferred electric circuit, which is energized from lines 52 and 53 connected to a suitable power source. We connect the coil of the time delay relay S across lines 52 and 53 in series with the flow switch 50 and with normally closed contacts 54, 55 and 56. The pipe conveyor opens contacts 54 or 55 as it carries a pipe into or out of the cutoff machine, and the kickout arm 23 opens contacts 56 as it kicks out a pipe. We connect the solenoid of valve 49 across these lines in series with normally open contacts $S_1$ of relay S. Thus a short time after the cutting tool 15 goes into "fine feed," contacts $S_1$ close to energize the solenoid and close the valve, as previously mentioned.

We connect a conventional bistable magnetic amplifier 57 and a shunt 58 in the circuit of the drive motor 13, and we connect the coil of a relay TA across lines 52 and 53 through the magnetic amplifier. The magnetic amplifier is a static switching device which turns on when motor 13 draws an accurately preset current of relatively large magnitude as the cutting tool engages the pipe and turns off when the motor draws another preset lower current as it idles. Relay TA picks up when the magnetic amplifier turns on and drops out when it turns off. A conventional load relay as shown in the aforementioned Henrici patent is largely equivalent, but we prefer the magnetic amplifier for greater accuracy and flexibility. We connect the coil of a relay B across lines 52 and 53 in series with the aforementioned pressure and flow switches 46 and 50 and contacts 54, 55 and 56, whereby relay B picks up when pressure switch 46 closes. We connect the coil of a relay A across lines 52 and 53 in series with normally open contacts $TA_1$ and $B_1$ of the respective relays, flow switch 50 and contacts 54, 55 and 56, whereby relay A picks up when both relays B and $TA_1$ pick up. Relay A has normally open contacts $A_1$ which close to seal in the relay around contacts $TA_1$ and $B_1$. Relay A can pick up only when two conditions are satisfied, to wit: (1) the current through motor 13 is of the large magnitude the motor draws during actual cutting or beveling operations, whereby relay TA picks up, and (2) the cutting tool is actually cutting the pipe, whereby pressure switch 46 closes and relay B picks up. Thus a beveling operation does not energize relay A, which is a necessary step before any of the counters are actuated.

We connect the aforementioned "total cut" counter 26 across lines 52 and 53 in series with contacts $A_2$ and $B_2$, flow switch 50 and contacts 54, 55 and 56. Contacts $B_2$ open when relay B picks up as pressure switch 46 closes at the start of a cutting operation. Hence counter 26 does not act immediately when relay A closes its contacts $A_2$. When pressure switch 46 opens at the conclusion of a cutting operation and relay B drops out, contacts $B_2$ again close, whereupon counter 26 is energized and counts a cut.

We also connect the coil of a relay C across lines 52 and 53 in series with contacts $A_2$ and $B_2$, flow switch 50 and contacts 54, 55 and 56. Thus relay C likewise picks up when relay B drops out at the conclusion of a cutting operation. Relay C has normally open contacts $C_1$ which close to seal in the relay around contacts $A_2$ and $B_2$. The purpose of contacts $C_1$ is to prevent relay C from dropping out in the event relay B picks up as the platen and cutting tool are retracted. We connect the aforementioned "finished pipe" counter 27 across lines 52 and 53 in series with normally open contacts $C_2$ of relay C and contacts 56. We also connect a relay E in parallel with counter 27 and normally open contacts $E_1$ of this relay in parallel with contacts $C_2$. When relay C picks up and contacts $C_2$ close at the conclusion of the first cut on each pipe, counter 27 is energized and counts a cut. At the same time relay E picks up and its contacts $E_1$ close to seal in both the relay and counter 27 around contacts $C_2$. We connect normally open contacts $C_3$ of relay C in parallel with the flow switch 50. When relay C picks up, contacts $C_3$ close, whereby relays A and C and the "total cut" counter 26 remain energized even though the flow switch 50 opens. When the pipe P moves either to right or left with the flow switch 50 open, one of the switches 54 or 55 opens to deenergize relays A and C and "total cut" counter, and thus enable the mechanism to count the next cut. The "finished pipe" counter 27 remains energized via contacts $E_1$ and hence does not count additional cuts on the same pipe. When the kickout arm 23 kicks out a finished pipe from the machine, contacts 56 open, whereupon counter 27 is deenergized and reset and relay E drops out.

We also connect the coil of a conventional stepping relay W across lines 52 and 53 in series with contacts $A_2$ and $B_2$, flow switch 50 and contacts 54, 55 and 56. Thus the stepping relay is energized and deenergized at the same time as the "total cut" counter 26. The stepping relay has a series of normally open contacts $W_1$, $W_2$ etc. The first time the coil is energized, contacts $W_1$ close, the next time $W_2$, etc. We connect one side of each contact to counter 28. The other side of the first four contacts $W_1$ to $W_4$ is unconnected. We connect the other side of the succeeding contacts $W_5$, etc. to line 53 in series with contacts $A_2$ and $B_2$, flow switch 50 and contacts 54, 55 and 56. Thus counter 28 is energized and counts the fifth cut and all succeeding cuts on the same pipe, but does not count the first four cuts. We connect a reset coil $W_R$ for the stepping relay across lines 52 and 53 in series with normally open contacts 59 operated by the kickout arm 23. When the arm kicks out a finished pipe, relay W drops out as contacts 56 open and the reset coil $W_R$ is energized to reset the relay.

From the foregoing description it is seen that our invention affords a virtually tamper-proof mechanism for counting the number of operations of a machine. At the same time the circuit is simplified over the circuit used heretofore. The counting mechanism is particularly useful as applied to a pipe cutoff machine, but can be adapted generally to any electrically driven machine for performing an operation on an article when the operation applies a force to the article.

While we have shown and described only a single embodiment of the invention, it is apparent that modifications may arise. Therefore, we do not wish to be limited to the disclosure set forth but only by the scope of the appended claims.

We claim:

1. In an electrically driven machine adapted to perform an operation on an article, which machine has a characteristic that the total number of operations may exceed the number of articles handled and which draws a relatively large current while performing an actual operation and a smaller current while idling, and which operation entails application of a force to the article, the combination therewith of a mechanism for counting both the number of actual operations and the number of articles handled, said mechanism comprising first and second counters, an electric circuit operatively connected with said counters, means in said circuit responsive to the relatively large current of an actual operation, separate means in said circuit responsive to the application of force to the article, said circuit being completed to actuate said counters only when both said means respond at the same time, and means in said circuit for preventing further actuation of said second counter after the first actuation thereof as long as subsequent operations are performed on the same article, whereby said first counter shows the total number of operations, said second counter shows the number of articles handled, and simulated operations actuate neither counter.

2. A combination as defined in claim 1 in which said machine is a pipe cutoff machine, and said operation is that of cropping the end portion of a pipe.

3. In an electrically driven machine adapted to perform an operation on an article, which machine has a characteristic that the total number of operations may exceed the number of articles handled and which draws a relatively large current while performing an actual operation and a smaller current while idling, and which operation entails application of a force to the article, the combination therewith of a mechanism for counting both the number of actual operations and the number of articles handled, said mechanism comprising first and second counters, an electric circuit operatively connected with said counters, contact means in said circuit operatively connected with said machine to close only when the machine draws the relatively large current of an actual operation, separate contact means in said circuit operatively connected with said machine to close only when the force is applied to the article, said circuit being completed to actuate said counters only when both said contact means are closed at the same time, and means in said circuit for preventing further actuation of said second counter after the first actuation thereof as long as subsequent operations are performed on the same article, whereby said first counter shows the total number of operations, said second counter shows the number of articles handled, and simulated operations actuate neither counter.

4. A combination as defined in claim 3 in which said machine is a pipe cutoff machine, said operation is that of cutting the end portions from pipes, said first counter shows the total number of cuts, and said second counter shows the number of finished pipes the machine handles.

5. In an electrically driven machine which includes means for supporting and rotating an article and fluid pressure means for performing an operation on the article, which machine has a characteristic that the total number of operations may exceed the number of articles handled and which draws a relatively large current while said fluid pressure means performs an actual operation and a smaller current while idling, said fluid pressure means applying a force to the article while performing an actual operation, the combination therewith of a mechanism for counting both the number of actual operations and the number of articles handled, said mechanism comprising first and second counters, an electric circuit operatively connected with said counters, a relay in said circuit operatively connected with said machine to be energized only when the machine draws the relatively large current of an actual operation, a pressure switch in said circuit operatively connected with said fluid pressure means to close only when said fluid pressure means applies a force to the article, means in said circuit completing a current path to said counters to actuate the counters only when said relay is energized and said pressure switch closed at the same time, and means in said circuit for preventing further actuation of said second counter after the first actuation thereof as long as subsequent operations are performed on the same article, whereby said first counter shows the total number of operations, said second counter shows the number of articles handled, and simulated operations actuate neither counter.

6. In an electrically driven machine adapted to perform an operation on an article, which machine has a characteristic that the total number of operations may exceed the number of articles handled and which draws a relatively large current while performing an actual operation and a smaller current while idling, and which operation entails application of a force to the article, the combination therewith of a mechanism for counting the number of actual operations, the number of articles handled, and the number of operations in excess of a predetermined number performed on any one article, said mechanism comprising first, second and third counters, an electric circuit operatively connected with said counters, means in said circuit responsive to the relatively large current of an actual operation, separate means in said circuit responsive to the application of force to the article, said circuit being completed to actuate said counters only when both said means respond at the same time, means in said circuit for preventing further actuation of said second counter after the first actuation thereof as long as subsequent operations are performed on the same article, and means in said circuit for preventing actuation of said third counter until the predetermined number of operations have been performed on the same article, whereby said first counter shows the total number of operations, said second counter shows the number of articles handled, said third counter shows the number of operations in excess of a predetermined number performed on any one article, and simulated operations actuate neither counter.

7. In an electrically driven machine which includes means for supporting and rotating an article and fluid pressure means for performing an operation on the article, which machine has a characteristic that the total number of operations may exceed the number of articles handled and which draws a relatively large current while said fluid pressure means performs an actual operation and a smaller current while idling, said fluid pressure means applying a force to the article while performing an actual operation, the combination therewith of a mechanism for counting the number of actual operations, the number of articles handled, and the number of operations in excess of a predetermined number performed on any one article, said mechanism comprising first, second and third counters, an electric circuit operatively connected with said counters, a relay in said circuit operatively connected with said machine to be energized only when the machine draws the relatively large current of an actual operation, a pressure switch in said circuit operatively connected with said fluid pressure means to close only when said fluid pressure means applies a force to the article, means in said circuit completing a current path to said counters to actuate the counters only when said relay is energized and said pressure switch closed at the same time, means in said circuit for preventing further actuation of said second counter after the first actuation thereof as long as subsequent operations are performed on the same article, and means in said circuit for preventing actuation of said third counter until the predetermined number of operations have been performed on the same article, whereby said first counter shows the total number of operations, said second counter shows the number of articles handled, said third counter shows the number of operations in excess of a predetermined number performed on any one article, and simulated operations actuate neither counter.

8. In an electrically driven machine adapted to perform an operation on an article, which machine draws a relatively large current while performing an actual operation and a smaller current while idling and which includes a hydraulic cylinder, a tool advanced and retracted by pressure in said cylinder for applying a force to the article in performing an operation thereon, and a pump for supplying hydraulic fluid to said cylinder, the combination therewith of a mechanism for counting the number of actual operations, said mechanism comprising a counter, an electric circuit operatively connected with said counter, a relay in said circuit operatively connected with said machine to be energized only when the machine draws the relatively large current of an actual operation, a normally open pressure switch in said circuit, an actuating device including a slidable member to which said switch is connected, means for applying the pressure in said cylinder equally to both ends of said member to hold said member in a balanced position in which said switch is open, means operatively connected with said circuit for holding the pressure on one end of said member and lowering the pressure on the other end during an actual operation and thereby closing said switch, said circuit being completed to actuate said counter only when said relay is energized and said pressure switch is closed at the same time to prevent simulated operations of said machine from actuating said counter.

9. In a machine which includes a hydraulic cylinder, a tool advanced and retracted by pressure in said cylinder, and a pump for supplying hydraulic fluid to said cylinder, the combination therewith of a mechanism for counting the number of operations of said machine, said mechanism comprising a counter, an electric circuit operatively connected with said counter and including a normally open pressure switch, an actuating device including a slidable member to which said switch is connected, conduits for normally applying the pressure in said cylinder equally to both ends of said member to hold said member in a balanced position in which said switch is open, and a valve in one of said conduits operatively connected with said circuit to be closed as said tool is advanced to hold the pressure on one end of said member, whereby a pressure drop on the other end of said member allows the member to move to close said switch, said counter being actuated only when said switch is closed.

References Cited by the Examiner

UNITED STATES PATENTS

| | | | |
|---|---|---|---|
| 1,713,276 | 5/29 | Goeckler | 235—92 |
| 1,772,148 | 8/30 | Hornberger | 82—2.5 |
| 1,972,595 | 9/34 | Libby | 82—2.5 |
| 2,651,465 | 9/53 | Higgs | 235—92 |
| 2,797,049 | 6/57 | Henrici et al. | 235—92 |
| 2,844,315 | 7/58 | Zelinsky | 235—92 |

MALCOLM A. MORRISON, *Primary Examiner.*